(12) United States Patent
Noda

(10) Patent No.: US 7,443,613 B2
(45) Date of Patent: Oct. 28, 2008

(54) THREE-PIECE LENS ASSEMBLY

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 63 days.

(21) Appl. No.: 11/458,425

(22) Filed: Jul. 19, 2006

(65) Prior Publication Data

US 2008/0019023 A1    Jan. 24, 2008

(51) Int. Cl.
*G02B 9/12*    (2006.01)
(52) U.S. Cl. .................. 359/784; 359/791; 359/792
(58) Field of Classification Search ......... 359/754–757, 359/759, 760, 763, 764, 767–769, 771, 772, 359/779, 780, 784, 791, 792
See application file for complete search history.

(56) References Cited

U.S. PATENT DOCUMENTS 6,987,625 B2 *  1/2006  Nakamura .................. 359/791
7,099,092 B2 *  8/2006  Sato ........................... 359/791

* cited by examiner

*Primary Examiner*—Darryl J Collins
(74) *Attorney, Agent, or Firm*—Banger Shia

(57) ABSTRACT

A three-piece lens assembly comprises: a first lens group, a second lens group, a third lens group and an aperture. The first lens group is a positive meniscus lens with a convex surface facing the object side and with another surface facing an aperture. The second lens group is a positive meniscus lens with a concave surface facing the aperture and the object side. The third lens group is a biconcave lens with a concave surface facing the second lens and the object side and with another surface facing the image side, and the concave surface of the third lens facing the object side is greater than the another surface of the third lens facing the image side in radius of curvature. Both sides of the first, second and third lens groups are aspheric and are all made of plastic material.

4 Claims, 17 Drawing Sheets

FOCAL LENGTH : f=3.37
BRIGHTNESS NUMERICAL VALUE :F3.43
VIEW ANGLE :2ω=71.2°

|   | r      | d    | nd      | νd   |
|---|--------|------|---------|------|
| 1 | 1.154  | 0.59 | 1.54340 | 56.5 |
| 2 | 5.555  | 0.11 |         |      |
| 3 | ∞      | 0.47 |         |      |
| 4 | -0.654 | 0.45 | 1.58340 | 30.2 |
| 5 | -0.774 | 0.33 |         |      |
| 6 | -8.868 | 0.90 | 1.54340 | 56.5 |
| 7 | 20.281 | 0.45 |         |      |
| 8 | ∞      | 0.30 | 1.51680 | 64.2 |
| 9 | ∞      |      |         |      |

$f_2/f_1 =$ 7.55
$(R_{31}-R_{32})/(R_{31}+R_{32}) =$ -2.55
$f/d_1 =$ 5.72
$f/d_2 =$ 7.54

$T/f =$ 1.19
$\alpha =$ 24.3° (MAXIMUM INCIDENT ANGLE)

spherical aberration astigmatic difference distortion aberration

FOCAL LENGTH : f=3.37
BRIGHTNESS NUMERICAL VALUE :F3.22
VIEW ANGLE :2ω=71.0°

| | r | d | nd | νd |
|---|---|---|---|---|
| 1 | 1.135176 | 0.5803037 | 1.5434 | 56.49 |
| 2 | 5.034 | 0.06 | | |
| 3 | ∞ | 0.51 | | |
| 4 | -0.63504 | 0.37 | 1.58340 | 30.2 |
| 5 | -0.738 | 0.15 | | |
| 6 | -7.803 | 1.13 | 1.54340 | 56.5 |
| 7 | 37.337 | 0.52 | | |
| 8 | ∞ | 0.30 | 1.51680 | 64.2 |
| 9 | ∞ | | | |

$f_2/f_1 =$ 9.394
$(R_{31}-R_{32})/(R_{31}+R_{32}) =$ -1.53
$f/d_1 =$ 5.81
$f/d_2 =$ 9.08

$T/f =$ 1.19
$\alpha =$ 25.0° (MAXIMUM INCIDENT ANGLE)

spherical aberration   astigmatic difference   distortion aberration

FOCAL LENGTH : f=3.37
BRIGHTNESS NUMERICAL VALUE :F3.15
VIEW ANGLE :2ω=71.0°

|   | r | d | nd | νd |
|---|---|---|---|---|
| 1 | 1.120 | 0.60 | 1.54340 | 56.5 |
| 2 | 4.205 | 0.07 | | |
| 3 | ∞ | 0.50 | | |
| 4 | -0.656 | 0.39 | 1.58340 | 30.2 |
| 5 | -0.745 | 0.17 | | |
| 6 | -6.808 | 1.05 | 1.54340 | 56.5 |
| 7 | 56.643 | 0.55 | | |
| 8 | ∞ | 0.30 | 1.51680 | 64.2 |
| 9 | ∞ | | | |

$f_2/f_1 =$ 5.81
$(R_{31} - R_{32})/(R_{31} + R_{32}) =$ -1.27
$f/d_1 =$ 5.65
$f/d_2 =$ 8.67

$T/f =$ 1.19
$\alpha =$ 25.0° (MAXIMUM INCIDENT ANGLE)

spherical aberration astigmatic difference distortion aberration

FOCAL LENGTH : f=3.37
BRIGHTNESS NUMERICAL VALUE :F3.21
VIEW ANGLE :2ω=71.1°

|   | r | d | nd | νd |
|---|---|---|---|---|
| 1 | 1.017 | 0.61 | 1.52996 | 55.8 |
| 2 | 3.151 | 0.05 | | |
| 3 | ∞ | 0.49 | | |
| 4 | −0.680 | 0.39 | 1.58340 | 30.2 |
| 5 | −0.804 | 0.08 | | |
| 6 | −9.298 | 1.19 | 1.52996 | 55.8 |
| 7 | 246.634 | 0.48 | | |
| 8 | ∞ | 0.30 | 1.51680 | 64.2 |
| 9 | ∞ | | | |

$f_2/f_1 =$ 17.22
$(R_{31}-R_{32})/(R_{31}+R_{32}) =$ −1.08
$f/d_1 =$ 5.48
$f/d_2 =$ 8.53

$T/f =$ 1.19
$\alpha =$ 25.0° (MAXIMUM INCIDENT ANGLE)

FOCAL LENGTH : f=3.37
BRIGHTNESS NUMERICAL VALUE : F3.19
VIEW ANGLE : $2\omega$ =71.1°

|   | r       | d    | nd      | νd   |
|---|---------|------|---------|------|
| 1 | 1.003   | 0.62 | 1.51357 | 56.8 |
| 2 | 3.270   | 0.05 |         |      |
| 3 | ∞       | 0.47 |         |      |
| 4 | −0.652  | 0.40 | 1.58340 | 30.2 |
| 5 | −0.777  | 0.13 |         |      |
| 6 | −9.300  | 1.10 | 1.51357 | 56.8 |
| 7 | 210.512 | 0.52 |         |      |
| 8 | ∞       | 0.30 | 1.51680 | 64.2 |
| 9 | ∞       |      |         |      |

$f_2/f_1 =$ 14.29
$(R_{31} - R_{32})/(R_{31} + R_{32}) =$ −1.09
$f/d_1 =$ 5.39
$f/d_2 =$ 8.33

$T/f =$ 1.19
$\alpha =$ 25.0° ( MAXIMUM INCIDENT ANGLE )

spherical aberration    astigmatic difference    distortion aberration

FOCAL LENGTH : f=3.35
BRIGHTNESS NUMERICAL VALUE :F3.39
VIEW ANGLE :2ω=71.1°

|   | r | d | nd | νd |
|---|---|---|---|---|
| 1 | 1.136 | 0.60 | 1.54340 | 56.5 |
| 2 | 5.177 | 0.11 | | |
| 3 | ∞ | 0.47 | | |
| 4 | −0.650 | 0.46 | 1.58340 | 30.2 |
| 5 | −0.769 | 0.32 | | |
| 6 | −9.125 | 0.85 | 1.54340 | 56.5 |
| 7 | 15.775 | 0.45 | | |
| 8 | ∞ | 0.30 | 1.51680 | 64.2 |
| 9 | ∞ | | | |

$f_2/f_1 =$ 6.81
$(R_{31} - R_{32})/(R_{31} + R_{32}) =$ −3.74
$f/d_1 =$ 5.63
$f/d_2 =$ 7.36
$T/f =$ 1.18
$\alpha =$ 24.1° (MAXIMUM INCIDENT ANGLE)

spherical aberration astigmatic difference distortion aberration

FOCAL LENGTH : f=3.36
BRIGHTNESS NUMERICAL VALUE :F3.43
VIEW ANGLE :2ω=71.1°

|   | r | d | nd | νd |
|---|---|---|---|---|
| 1 | 1.212 | 0.58 | 1.54340 | 56.5 |
| 2 | 7.691 | 0.11 | | |
| 3 | ∞ | 0.50 | | |
| 4 | -0.646 | 0.45 | 1.58340 | 30.2 |
| 5 | -0.750 | 0.31 | | |
| 6 | -7.803 | 0.89 | 1.54340 | 56.5 |
| 7 | 14.973 | 0.45 | | |
| 8 | ∞ | 0.30 | 1.51680 | 64.2 |
| 9 | ∞ | | | |

$f_2/f_1 =$ 5.40
$(R_{31} - R_{32})/(R_{31} + R_{32}) =$ -3.18
$f/d_1 =$ 5.82
$f/d_2 =$ 7.51

$T/f =$ 1.19
$\alpha =$ 24.1° ( MAXIMUM INCIDENT ANGLE )

spherical aberration    astigmatic difference    distortion aberration (Embodiment 1) aspherical coefficient surface No 1
K= 4.94773E-01
A= -4.15491E-02
B= -1.75065E-01
C= 2.44918E-02
D= 1.24342E-01
E= -8.60357E-01 surface No 2
K= 0.00000E+00
A= -1.71846E-01
B= 3.05249E-01
C= -6.95419E+00
D= 4.52917E+01
E= -1.80853E+02 surface No 3
K= 2.89951E-01
A= -5.23482E-02
B= 5.54926E-02
C= 5.00012E+00
D= -4.35982E+00
E= -4.95736E+01 surface No 4
K= -6.11633E-01
A= -2.23785E-02
B= -8.19589E-02
C= 4.29273E-01
D= 3.35791E-01
E= 1.33116E+00 surface No 5
K= 0.00000E+00
A= -8.57575E-02
B= 4.44691E-02
C= -1.53300E-03
D= -3.43878E-03
E= -1.67683E-04 surface No 6
K= 0.00000E+00
A= -1.14084E-01
B= 3.34884E-02
C= -1.49938E-02
D= 3.32949E-03
E= -1.70007E-04

(Embodiment 2) aspherical coefficient surface No 1
K= 6.16836E-01
A= -5.24737E-02
B= -1.15333E-01
C= -1.76943E-01
D= 4.34242E-01
E= -8.62517E-01 surface No 2
K= 1.00000E+00
A= -1.25603E-01
B= 4.41852E-01
C= -7.55528E+00
D= 4.56783E+01
E= -1.80519E+02 surface No 3
K= -1.81893E-01
A= -3.20397E-02
B= 2.10559E-01
C= 4.10773E+00
D= 6.08776E+00
E= -8.08985E+01 surface No 4
K= -8.00490E-01
A= 9.38654E-02
B= -1.23353E-01
C= 1.46005E+00
D= 2.59908E-01
E= -9.13753E-01 surface No 5
K= -8.50000E+01
A= -2.00016E-02
B= 1.74022E-02
C= -5.34537E-03
D= -1.05419E-03
E= 5.30036E-04 surface No 6
K= 1.00000E+00
A= -1.02481E-01
B= 3.64692E-02
C= -1.64916E-02
D= 3.19344E-03
E= -4.68317E-05

(Embodiment 3) aspherical coefficient surface No 1
K= 5.01183E-01
A= -3.97707E-02
B= -6.29944E-02
C= -2.47494E-01
D= 5.94424E-01
E= -7.29860E-01 surface No 2
K= -1.00000E+00
A= -9.52748E-02
B= 4.07858E-01
C= -6.90845E+00
D= 4.45404E+01
E= -1.89312E+02 surface No 3
K= -1.68290E-01
A= -7.17168E-02
B= 1.44833E-02
C= 4.05815E+00
D= 7.42422E+00
E= -8.67734E+01 surface No 4
K= -7.77860E-01
A= 1.04119E-01
B= -1.96343E-01
C= 1.37999E+00
D= 2.21754E-01
E= -7.25628E-01 surface No 5
K= -8.50000E+01
A= -1.50833E-02
B= 1.40780E-02
C= -4.94354E-03
D= -6.85139E-04
E= 3.85448E-04 surface No 6
K= -8.50000E+01
A= -1.03402E-01
B= 3.76907E-02
C= -1.69498E-02
D= 3.07269E-03
E= 1.67120E-05

FIG. 8A (Embodiment 4) aspherical coefficient

| surface No 1 | surface No 2 | surface No 3 |
|---|---|---|
| K= 3.64704E-01 | K= 5.19523E-01 | K= 2.85515E-01 |
| A= -2.68057E-02 | A= -4.67580E-02 | A= 6.35438E-02 |
| B= -4.01606E-02 | B= 3.25242E-01 | B= -6.93684E-02 |
| C= -2.52100E-01 | C= -6.41890E+00 | C= 3.70757E+00 |
| D= 5.63688E-01 | D= 4.42274E+01 | D= 1.19037E+01 |
| E= -4.90454E-01 | E= -1.99191E+02 | E= -9.30401E+01 |

| surface No 4 | surface No 5 | surface No 6 |
|---|---|---|
| K= -7.61829E-01 | K= -8.50000E+01 | K= 1.00000E+00 |
| A= 8.07980E-02 | A= -1.64975E-02 | A= -9.36884E-02 |
| B= -2.58812E-01 | B= 2.54321E-02 | B= 3.28451E-02 |
| C= 1.16730E+00 | C= -6.34080E-03 | C= -1.56326E-02 |
| D= 1.74745E-01 | D= -2.61955E-03 | D= 3.08698E-03 |
| E= -3.11960E-01 | E= 3.88156E-04 | E= -2.69196E-05 |

(Embodiment 5) aspherical coefficient

| surface No 1 | surface No 2 | surface No 3 |
|---|---|---|
| K= 3.23260E-01 | K= -4.82344E-01 | K= 1.82951E-01 |
| A= -2.33278E-02 | A= -4.98339E-02 | A= 3.17121E-02 |
| B= -2.68749E-02 | B= 2.67220E-01 | B= 1.14405E-01 |
| C= -3.33709E-01 | C= -6.09838E+00 | C= 3.49548E+00 |
| D= 8.18983E-01 | D= 4.24496E+01 | D= 1.38941E+01 |
| E= -7.96833E-01 | E= -2.00842E+02 | E= -9.83375E+01 |

| surface No 4 | surface No 5 | surface No 6 |
|---|---|---|
| K= -7.77103E-01 | K= -8.43021E+01 | K= -8.50000E+01 |
| A= 7.11704E-02 | A= -1.05000E-02 | A= -9.89903E-02 |
| B= -2.38142E-01 | B= 2.04519E-02 | B= 3.41353E-02 |
| C= 1.23115E+00 | C= -6.26825E-03 | C= -1.56341E-02 |
| D= 1.15495E-01 | D= -2.15761E-03 | D= 2.85184E-03 |
| E= -3.42501E-01 | E= 4.24467E-04 | E= 4.52595E-05 |

(Embodiment 6) aspherical coefficient

| surface No 1 | surface No 2 | surface No 3 |
|---|---|---|
| K= 5.01864E-01 | K= 1.00000E+00 | K= 3.07391E-01 |
| A= -4.01068E-02 | A= -1.63810E-01 | A= -5.12463E-02 |
| B= -1.75077E-01 | B= 3.17356E-01 | B= 3.96626E-02 |
| C= 2.68926E-02 | C= -6.95104E+00 | C= 5.24895E+00 |
| D= 1.30379E-01 | D= 4.52837E+01 | D= -2.70718E+00 |
| E= -8.52620E-01 | E= -1.80747E+02 | E= -4.86175E+01 |

| surface No 4 | surface No 5 | surface No 6 |
|---|---|---|
| K= -6.14694E-01 | K= 1.00000E+00 | K= -8.50000E+01 |
| A= -2.12982E-02 | A= -8.62385E-02 | A= -1.17521E-01 |
| B= -7.74198E-02 | B= 4.43627E-02 | B= 3.30909E-02 |
| C= 4.31118E-01 | C= -1.53292E-03 | C= -1.49917E-02 |
| D= 3.28346E-01 | D= -3.43050E-03 | D= 3.32826E-03 |
| E= 1.31624E+00 | E= -1.63068E-04 | E= -1.75880E-04 |

FIG. 8B (Embodiment 7) aspherical coefficient

| surface No 1 | surface No 2 | surface No 3 |
|---|---|---|
| K= 4.96644E-01 | K= -1.00000E+00 | K= 2.72915E-01 |
| A= -4.42685E-02 | A= -1.95538E-01 | A= 4.11108E-02 |
| B= -2.00145E-01 | B= 3.58203E-01 | B= -5.78696E-01 |
| C= 6.11857E-02 | C= -7.05595E+00 | C= 9.22857E+00 |
| D= 1.52698E-01 | D= 4.67654E+01 | D= -1.77056E+00 |
| E= -1.00535E+00 | E= -1.83592E+02 | E= -8.74923E+01 |

| surface No 4 | surface No 5 | surface No 6 |
|---|---|---|
| K= -6.44043E-01 | K= -2.96261E+01 | K= -8.50000E+01 |
| A= -2.77750E-03 | A= -8.08435E-02 | A= -1.16257E-01 |
| B= -1.01559E-01 | B= 4.33561E-02 | B= 3.78141E-02 |
| C= 4.77513E-01 | C= -3.99496E-03 | C= -1.64393E-02 |
| D= 4.82879E-01 | D= -3.69716E-03 | D= 3.31478E-03 |
| E= 1.18596E+00 | E= 1.76257E-04 | E= -8.68244E-05 |

FIG. 8C

THREE-PIECE LENS ASSEMBLY

BACKGROUND OF THE INVENTION

1. Field of the Invention

The present invention relates to a lens assembly, and more particularly to a three-piece lens assembly.

2. Description of the Prior Art

Along with the miniaturization of the digital camera and the mobile phone, the lens assembly used in the digital camera and the mobile phone also has a tendency toward miniaturization, therefore, the imaging device usually takes the form of CCD sensor (charge coupled device) or CMOS sensor (Complementary Metal Oxide Semiconductor). However, along with the miniaturization of the imaging device, the resultant optical length is also shortened. Therefore, the design of incident angle becomes particularly important.

In the past, a plastic-made triplet aspheric lens with point of inflexion was developed to achieve miniaturization and to improve the incident angle, thus F ensuring the optical performance of the lens and the accomplishment of designing a precision incident angle, and effectively shortening the optical length.

Please refer to the three patent documents, 1: JP Pt. No. 2005-173298, 2: JP Pt. No. 2005-242286, and 3: JP Pt. No. 2005-309210.

The optical lens assembly in Document 1, starting from the object side, comprises a first lens group, an aperture, a second lens group and a third lens group. The first lens group includes a positive meniscus lens whose convex surface faces the object side, the second lens group includes a meniscus lens with a convex surface facing the image side, and the second lens group includes a negative lens (in the embodiment, the negative lens is a meniscus lens with a convex surface facing the object side).

The optical lens assembly in Document 2 also comprises three lenses and an aperture that are arranged similarly to the Document 1, the first lens group includes a positive lens with a convex surface facing the object side, the second lens group includes a positive lens (which is a positive meniscus lens in the embodiment) with a convex surface facing the image side, and the third lens group includes a negative lens (which is a negative meniscus lens in the embodiment) with a concave surface facing the image side.

The optical lens assembly in Document 3 also comprises three lenses and an aperture that are arranged similarly to the Document 1, wherein the first lens group includes a positive lens with a convex surface facing the object side, the second lens group includes a meniscus lens with a concave surface facing the object side, and the third lens group has a function of aberration compensation. In the embodiment, the first lens group is a positive meniscus lens or a biconvex lens, the second lens group is a positive or negative meniscus lens, and the third lens is a negative meniscus lens or a biconcave lens.

However, the abovementioned three optical lens assemblies disclosed in the three documents still have many problems. For example, the magnification of the Document 1 is relatively great, approximately 1.35-1.43, and the magnification of the Document 1 is also great, approximately 1.35-1.48. The magnification of the Document 3 is relatively small, approximately 1.18-1.20, however, the resultant angle of view is as low as 62°, which results in some problems. (magnification T/f is the proportion between the total focal length f of the whole optical system and the entire optical length T).

In view of the abovementioned problems, in the optical technology field, it needs a three-piece imaging taking lens assembly that not only has a miniaturized size but also has a wide angle of view and a good performance of aberration compensation.

SUMMARY OF THE INVENTION

The primary objective of the present invention is to provide a three-piece lens assembly hat not only has a miniaturized size but also has a wide angle of view and a good performance of aberration compensation.

Based on the abovementioned objective, a three-piece lens assembly provided by the present invention comprises: a first lens group, a second lens group, a third lens group and an aperture. The first lens group is a positive meniscus lens with a convex surface facing the object side and with another surface facing an aperture. The second lens group is a positive meniscus lens with a concave surface facing the aperture and the object side. The third lens group is a biconcave lens with a concave surface facing the second lens and the object side and with another surface facing the image side, and the concave surface of the third lens facing the object side is greater than the another surface of the third lens facing the image side in radius of curvature. Both sides of the first, second and third lens groups are aspheric and are all made of plastic material.

The three-piece lens assembly of the present invention is miniaturized by reducing the magnification, and particularly. When the third lens group is a biconcave lens, and the radius of curvature of the object side surface of the third lens group is greater than that of the image side surface thereof, the incident angle of the present invention can get a perfect compensation. In addition, the angle of view reaches 70°, which is better than the conventional art. In this way, a high performance mini lens assembly with good incident angle compensation is provided.

BRIEF DESCRIPTION OF THE DRAWINGS

FIG. 8A shows the aspherical coefficients of the imaging lens arrays in accordance with the first, second and third embodiments of the present invention;

FIG. 8B shows the aspherical coefficients of the imaging lens arrays in accordance with the fourth, fifth and sixth embodiments of the present invention; and FIG. 8C shows the aspherical coefficients of the imaging lens arrays in accordance with the seventh embodiment of the present invention.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1A:
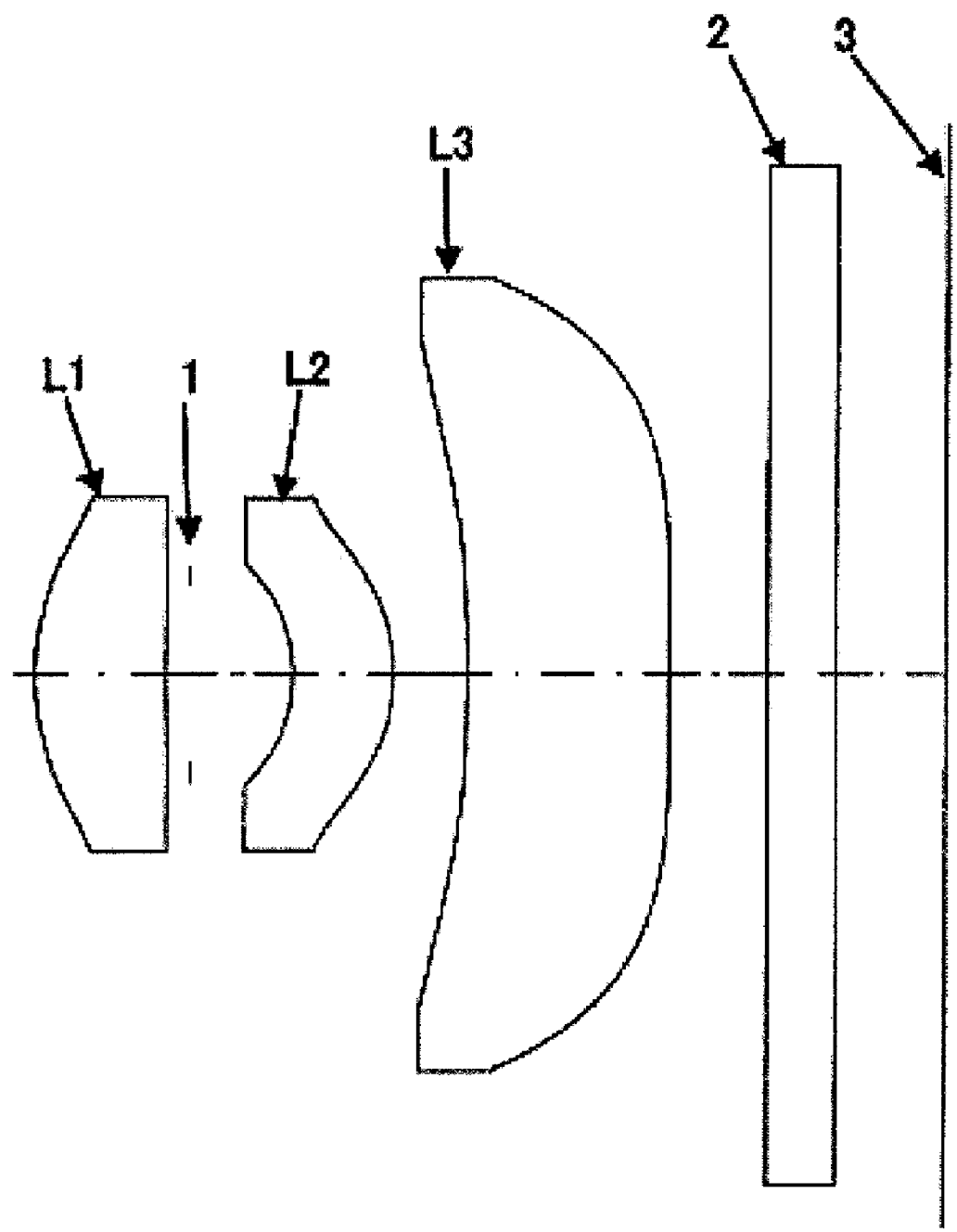
FIG. 1A shows an image lens array in accordance with a first embodiment of the present invention.
Figure 1B:
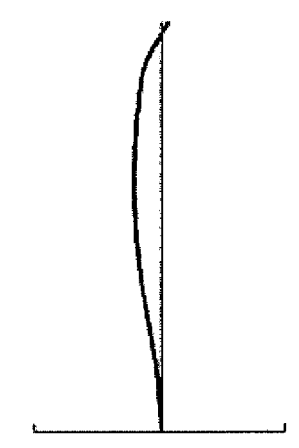
FIG. 1B shows the real numerical values of the respective lens of the first embodiment.
Figure 1B:
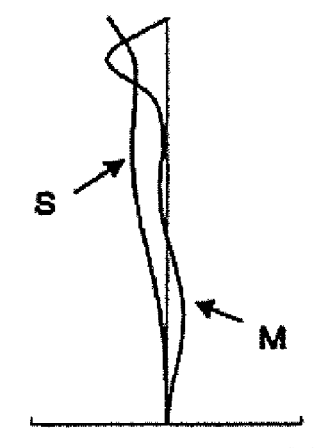
Figure 1B:
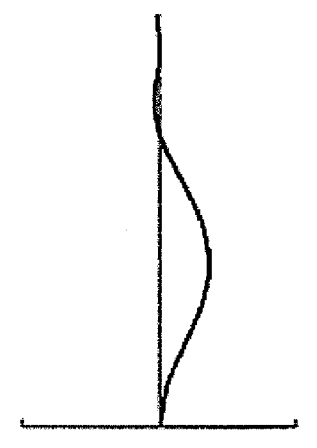
Figure 2A:
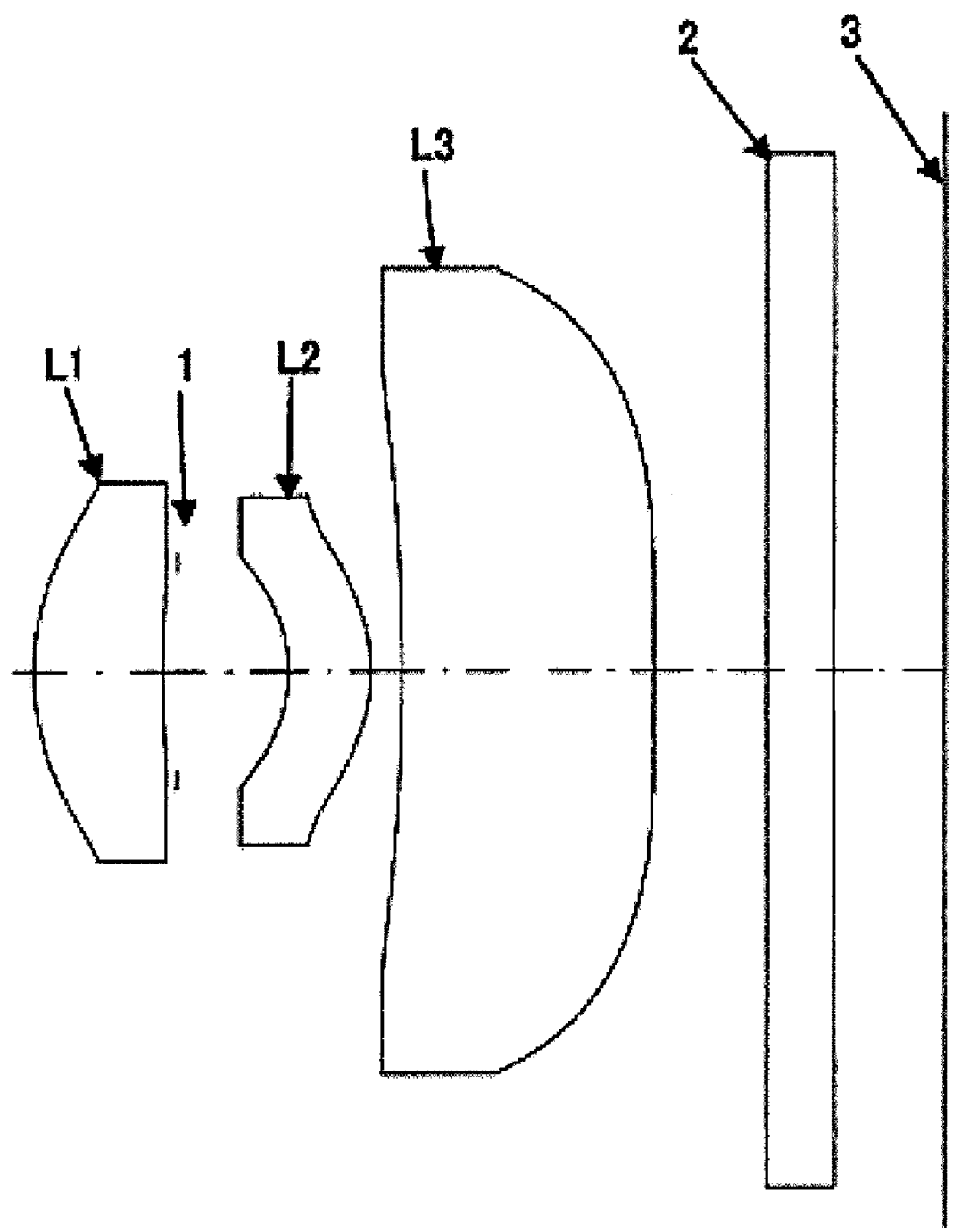
FIG. 2A shows an image lens array in accordance with a second embodiment of the present invention.
Figure 2B:
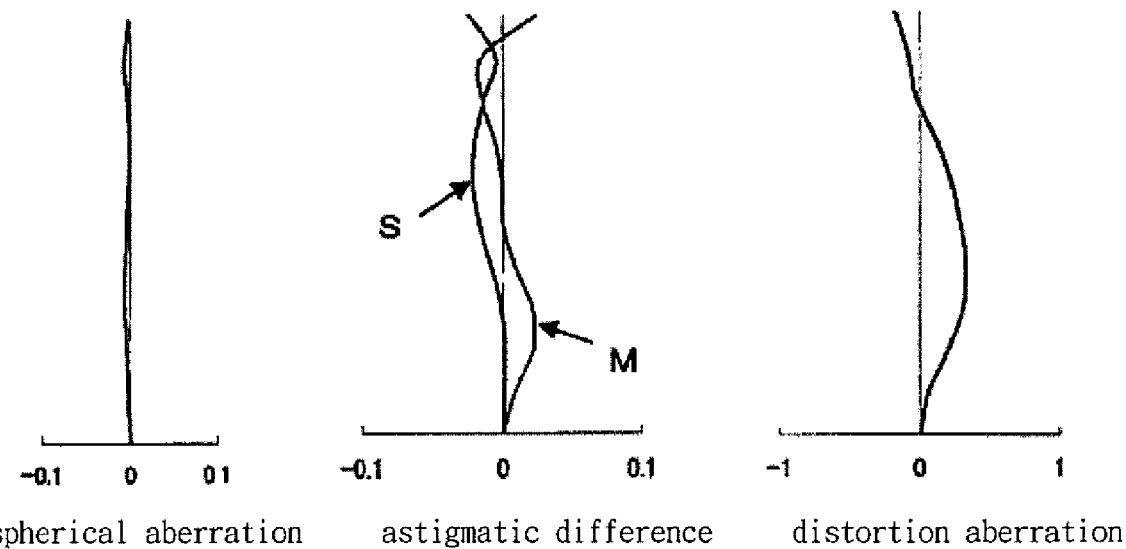
FIG. 2B shows the real numerical values of the respective lens of the second embodiment.
Figure 3A:
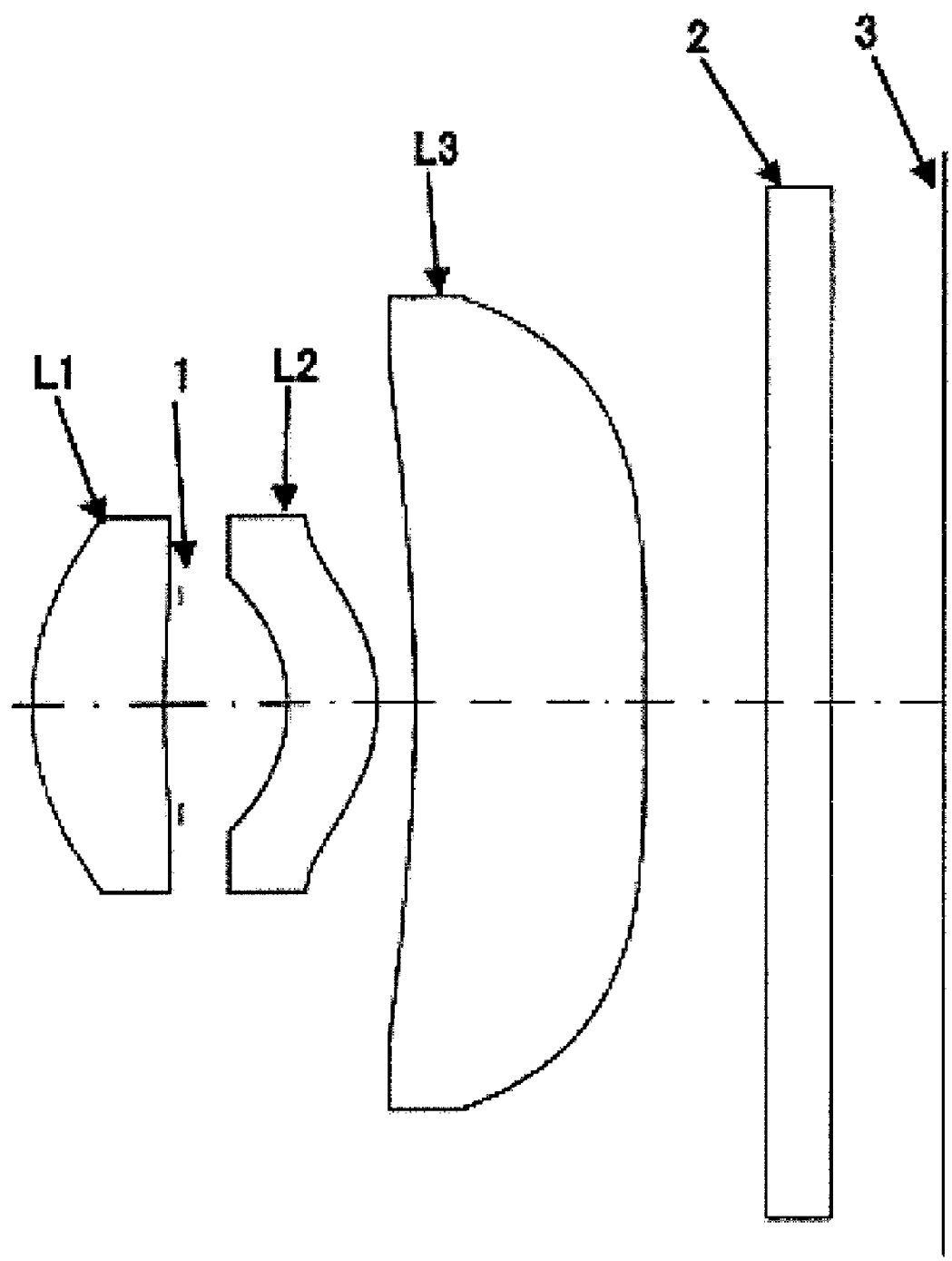
FIG. 3A shows an image lens array in accordance with a third embodiment of the present invention.
Figure 3B:
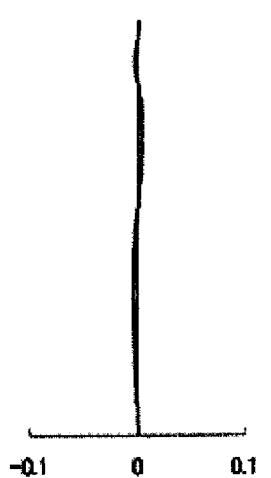
FIG. 3B shows the real numerical values of the respective lens of the third embodiment.
Figure 3B:
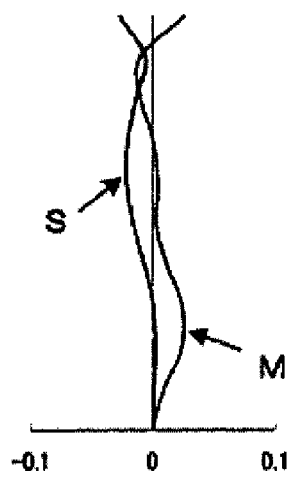
Figure 3B:
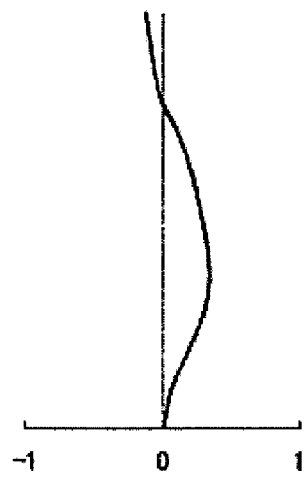
Figure 4A:
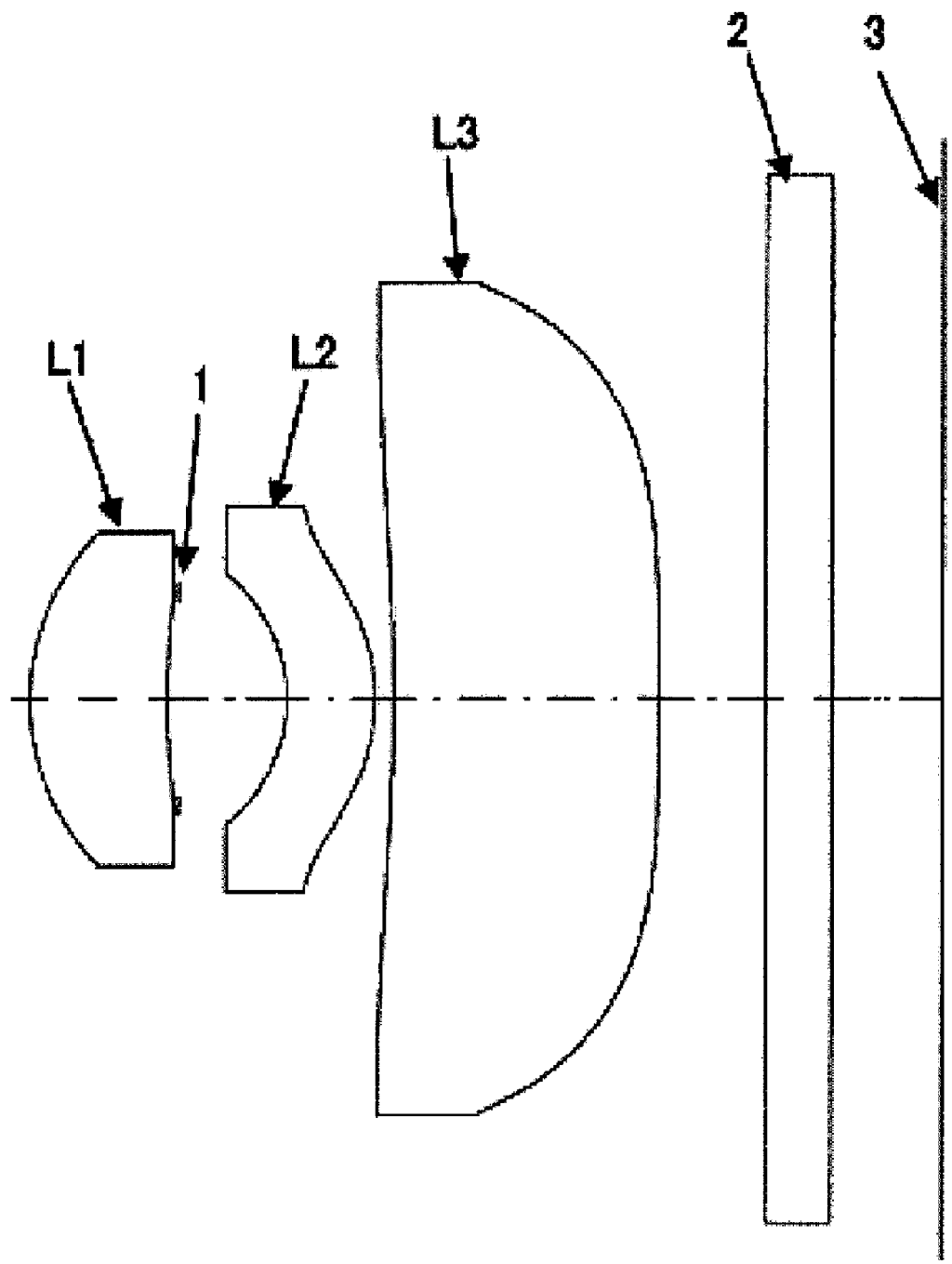
FIG. 4A shows an image lens array in accordance with a fourth embodiment of the present invention.
Figure 4B:
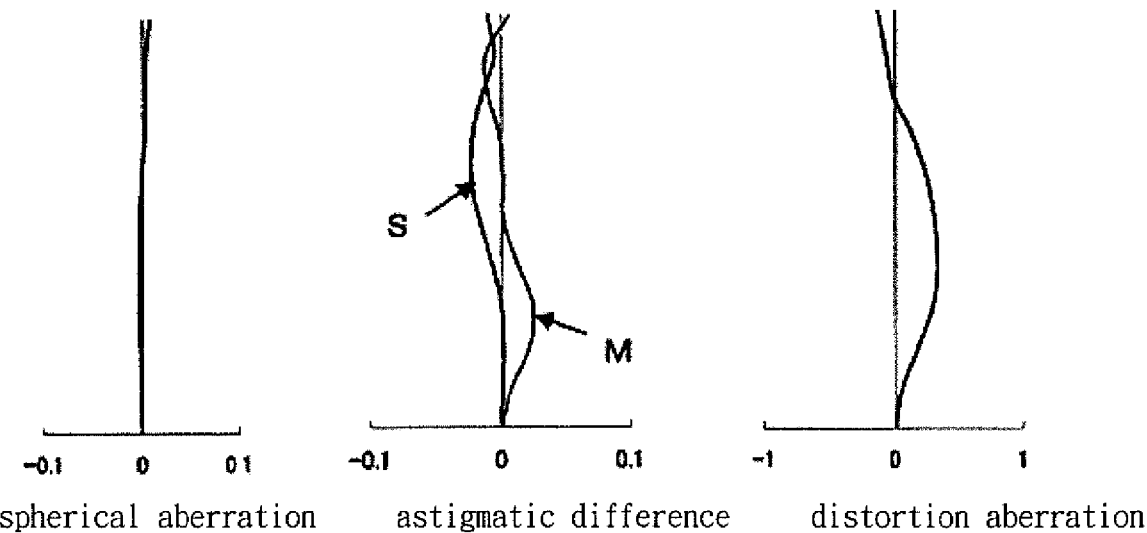
FIG. 4B shows the real numerical values of the respective lens of the fourth embodiment.
Figure 5A:
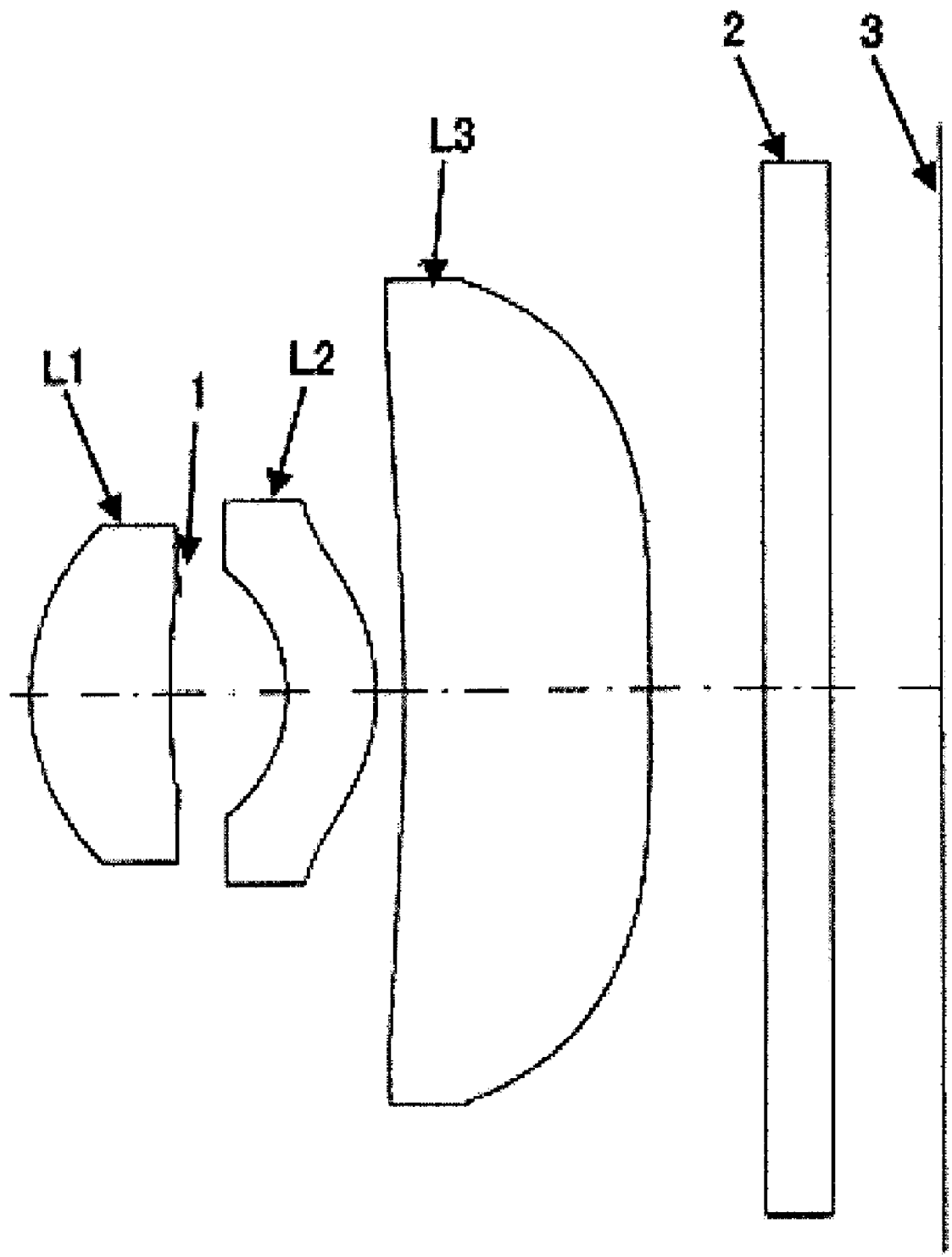
FIG. 5A shows an image lens array in accordance with a fifth embodiment of the present invention.
Figure 5B:
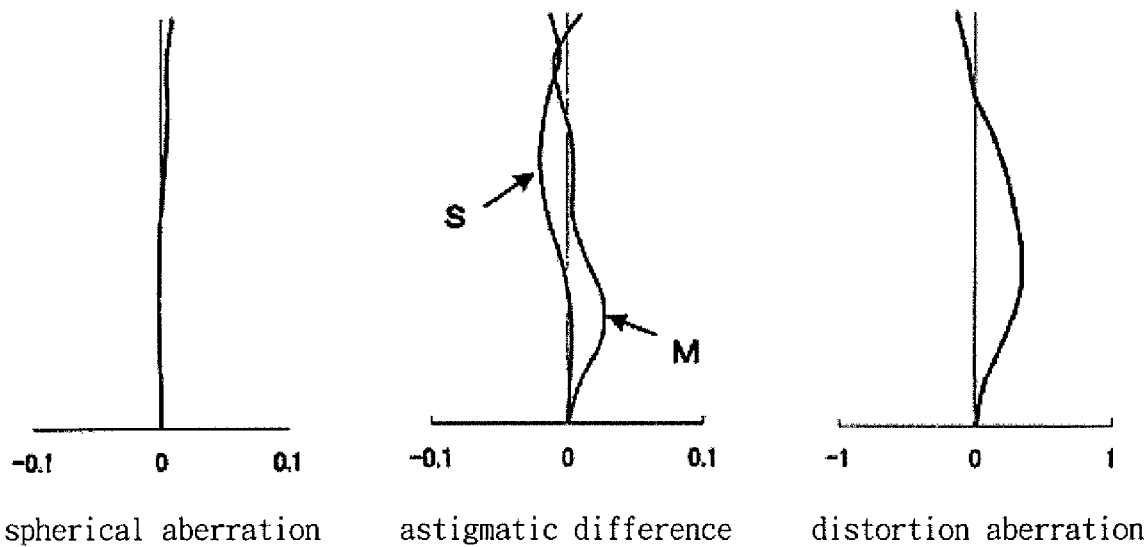
FIG. 5B shows the real numerical values of the respective lens of the fifth embodiment.
Figure 6A:
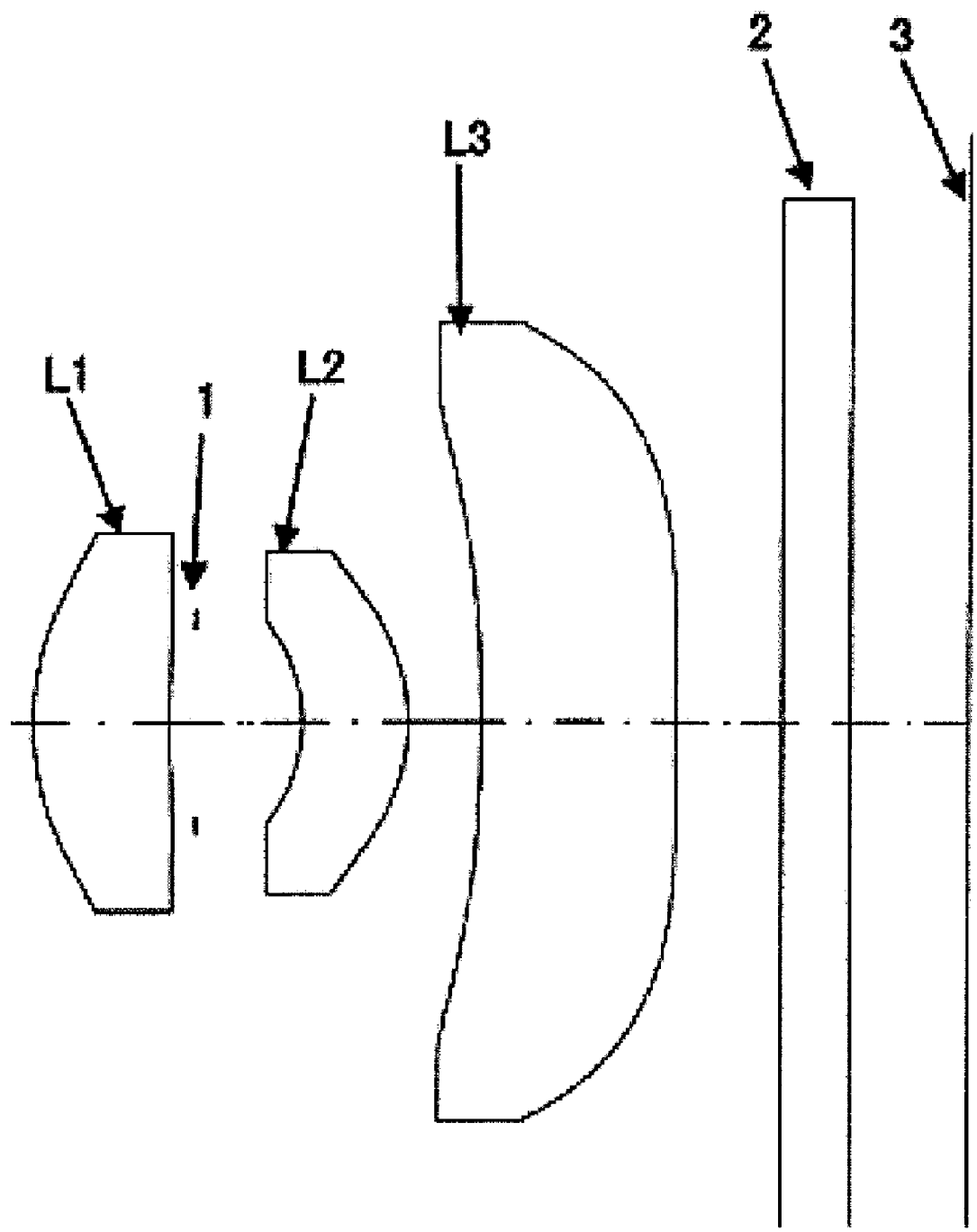
FIG. 6A shows an image lens array in accordance with a sixth embodiment of the present invention.
Figure 6B:
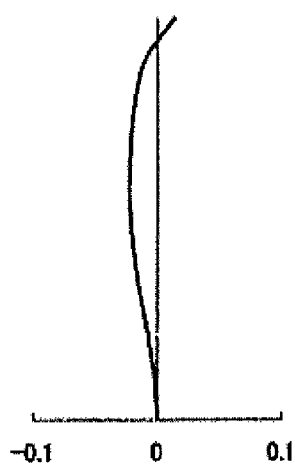
FIG. 6B shows the real numerical values of the respective lens of the sixth embodiment.
Figure 6B:
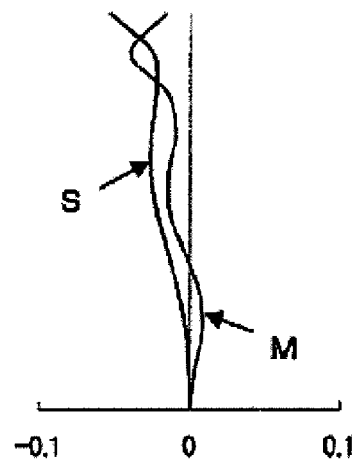
Figure 6B:
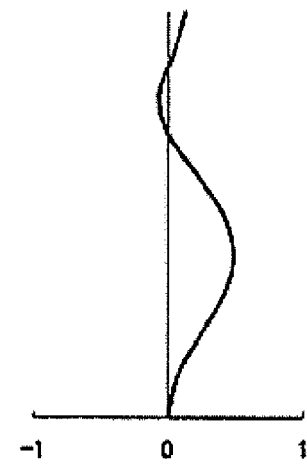
Figure 7A:
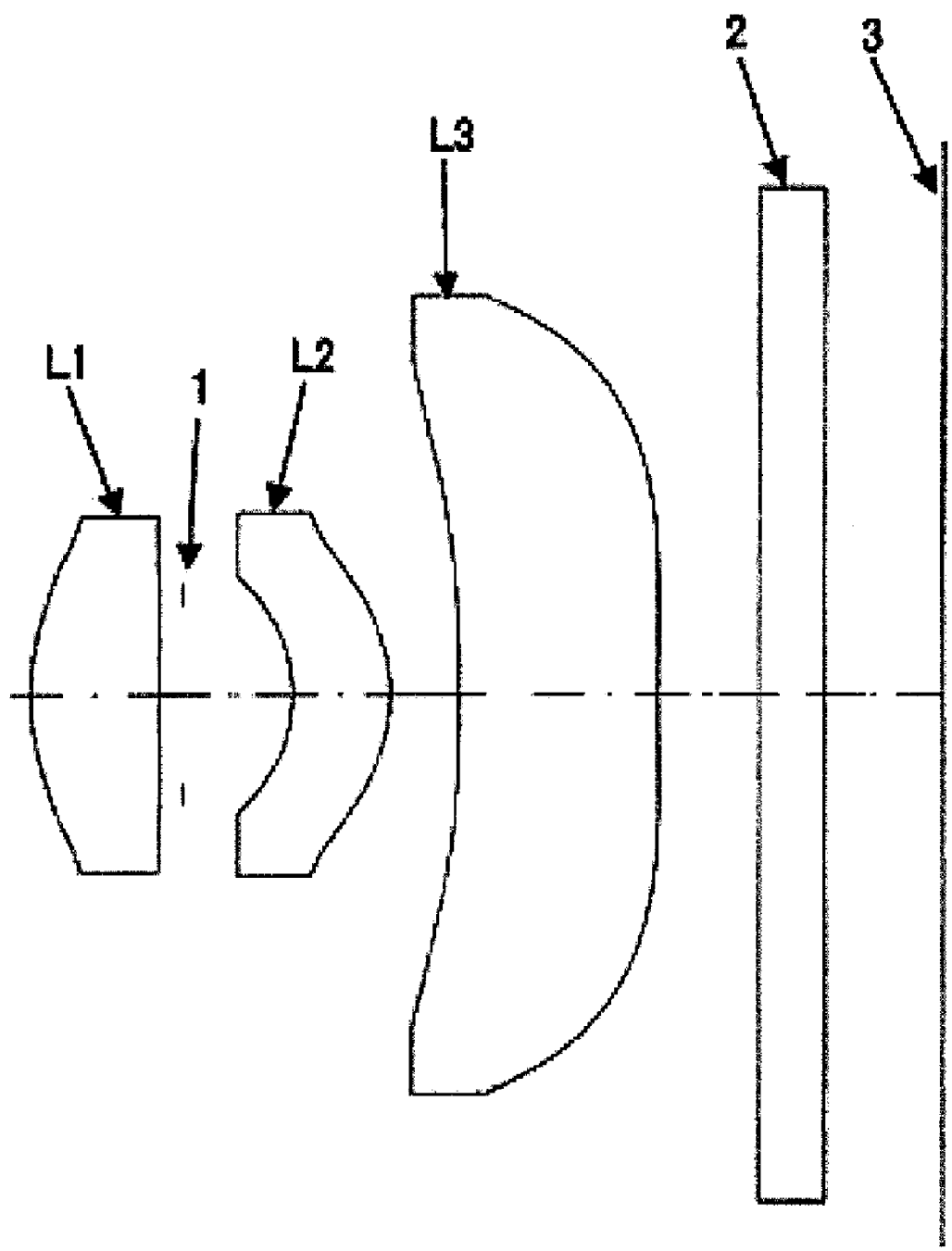
FIG. 7A shows an image lens array in accordance with a seventh embodiment of the present invention.
Figure 7B:
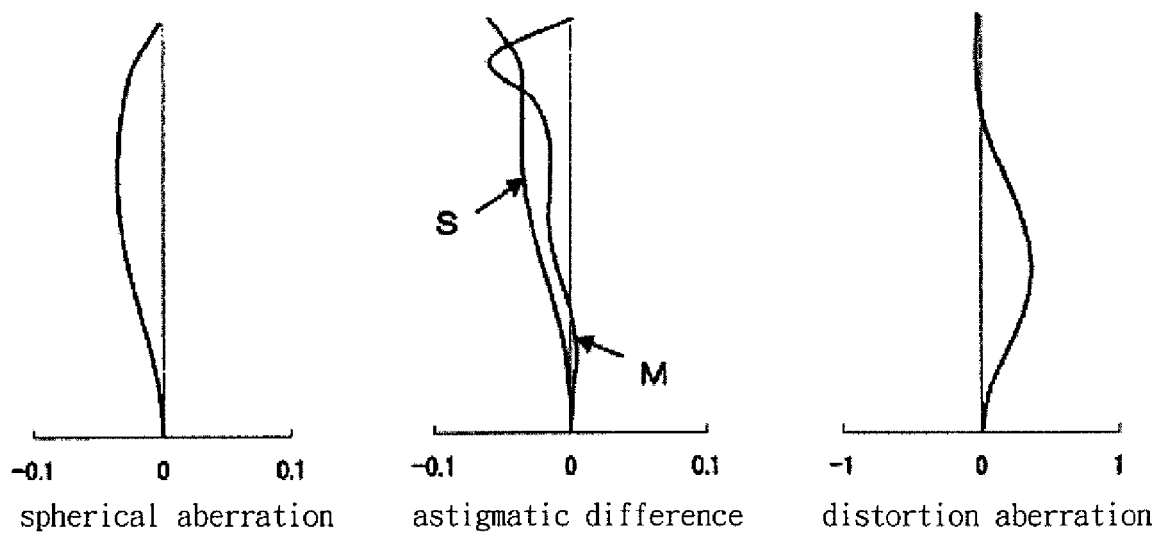
FIG. 7B shows the real numerical values of the respective lens of the seventh embodiment.

Referring to FIGS. 1A-7A, which show different imaging lens assemblies in accordance with the respective embodiments of the present invention.

As shown, the respective embodiments comprises a first lens group L1, an aperture 1, a second lens group L2, a third lens group L3, a parallel flat glass 2, and an imaging plane 3, which are arranged in order along an optical axis from the object side.

The first lens group L1 is a positive meniscus lens with a convex surface facing the object side. The second lens group L2 is a positive meniscus lens with a concave surface facing the object side. The third lens group L3 is a biconvex lens with a point of inflexion, and the curvature of the object side of the third lens group L3 is comparatively strong. The parallel flat glass 2 has an infrared filter function. The imaging plane 3 is CCD or other device of the like.

As compared to a biconvex lens of the same curvature, the first lens group L1 is a comparatively thin positive meniscus lens, so it can form a relatively short lens assembly. Besides, the first lens group L1, the second lens group L2 and the third lens group L3 are all made of the plastic material whose refraction index is smaller than 1.6, for instance, PC. As compared to the ordinary glass material, the material of the present invention is cheaper and the material management cost is relatively low.

In addition, the respective optical surfaces of the first, second and third lens groups L1, L2, L3 are also aspheric, so that the number of lenses of the respective lens group can be reduced, effectively saving cost.

Referring to FIGS. 1B-7B, which show the real numerical values of the respective lens of the respective embodiments.

As shown, the focal length on the top of the respective Figures is f, brightness numerical value is Fno~F, and 2 ω represents the angle of view. The unit of the focal length f is mm. The Arabic numbers 1, 2, 3 . . . 9 represent the sequence number of the surfaces of the respective lenses from the object side. For example, the front surface and the rear surface of the first lens group L1 are designated by 1 and 2, respectively. Surface No 3 represents the aperture 1. 4 and 5 represent both sides of the second lens group L2, 6 and 7 represent both sides of the third lens group L3, while 8 and 9 represent both sides of the parallel flat glass 2. The r represents the paraxial radius of curvature (its unit is mm), d represents the thickness of the lens and its unit is mm. nd means the index of refraction and vd means reciprocal dispersion. The radius of curvature r of the surface Nos 8 and 9 of the parallel flat glass 2 and the surface No 3 of the aperture are ∞.

The respective figures also show the spherical aberration, the astigmatic difference and the distortion aberration of the respective embodiments. The data of the d line is shown in each of the drawings, and the astigmatic difference includes the (S) plane and the (M) plane. And it can be seen form these figures that the aberration compensation of the present invention is ok.

The third lens group L3 is a biconvex lens whose object side (surface No 6) is greater than its image side (surface No 7) in radius of curvature, therefore, it can be used to form a wide angle lens assembly with an angle of view greater than 70°.

Both sides of the first, second and third lens groups L1, L2 and L3 are aspheric. The aspherical coefficients of the respective lenses are indicated by A, B, C D and E, the height of the optical axis is H, and the deflection of the optical axis is X, and then a formula will be satisfied:

$$X=(1/R)H^2/\{1+[1-(1+K)(H/R)^2]^{1/2}\}+AH^4+BH^6+CH^8+DH^{10}+EH^{12}$$

The capital R in this formula represents the paraxial radius of curvature, K represents the conical coefficients, the aspherical coefficient E-03 represents $10^{-3}$.

The focal length $f_1$ of the first lens group and the focal length $f_2$ of the second lens group satisfy the relation: $5.0<f_2/f_1<18.0$. When the value of $f_2/f_1$ is minor than 5.0, since the positive refractive power of the second lens group L2 is increased, to compensate the aberration, the third lens group L3 must have a stronger negative refractive power. However, if the negative refractive power is too strong, it will damage the characteristic of the incident angle. Furthermore, when $f_2/f_1$ is greater than 18.0, the positive refractive power of the second lens group L2 will be weakened, and to maintain the refractive power of the whole optical system, the first lens group L1 must have a comparatively great refractive power. However, a comparatively great refractive power will lead to a bad coma aberration, damaging the peripheral optical performance.

The radius of curvature of the object side (surface No 6) of the third lens group L3 is $R_{31}$, and the radius of curvature of the object side (surface No 6) of the third lens group L3 is $R_{32}$, they satisfy the following relation:

$$-3.9<(R_{31}-R_{32})/(R_{31}+R_{32})<-0.9$$

If the value of $(R_{31}-R_{32})/(R_{31}+R_{32})$ is smaller than −3.9, the $R_{32}$ will be too small. Therefore, the third lens group L3 must have a comparatively strong refractive power, but it will damage the characteristic of the incident angle. Thereby, the inclination (the angle between the normal of the surface and the optical axis) of the periphery of the image side of the third lens group L3 must be increased. However, to do so would have the difficulty in manufacturing the mould. When the value of $(R_{31}-R_{32})/(R_{31}+R_{32})$ is greater than −0.9, the negative refractive power of the third lens group L3 will be weakened, so it must increase the thickness of the third lens group L3, and as a result, the length of the whole optical system is increased.

The focal length f of the optical system consisted of the first, second and third lens groups L1, L2, L3, and the thickness d1 of the first lens groups L1 satisfy the relation: $5.0<f/d_1<6.0$. When the value of f/d1 is less than 5.0, the first lens group L1 will be too thick and will do no good to miniaturization. When the value of f/d1 is greater than 6.0, the first lens group L1 will be too thin, and the thickness of the periphery of the lens cannot be ensured, thus causing manufacturing troubles.

The focal length f of the optical system consisted of the first, second and third lens groups L1, L2, L3, and the thickness of the second lens groups L2 is d2, and they satisfy the relation: $7.0<f/d_2<9.5$. When the value of f/d2 is less than 7.0, the second lens group L2 will be too thick and will do no good to miniaturization. When the value of f/d2 is greater than 9.5, the second lens group L2 will be too thin, and the thickness of the periphery of the lens cannot be ensured, thus causing manufacturing troubles.

In addition, the reciprocal dispersion of the first lens assembly is vd1, the reciprocal dispersion of the second lens assembly is vd2, the reciprocal dispersion of the third lens assembly is vd3, and they satisfy the following relations:

$$50 \leq v\,d_1 \leq 60$$

$$25 \leq v\,d_2 \leq 35$$

$$50 \leq v\,d_3 \leq 60$$

When the above three relations are satisfied, the optical system will have a comparatively good color aberration compensation.

What follows are the parameters of the conditional expression of the respective embodiments:

Based on the optical system of the present invention, the magnification T/f (T is the length of the imaging plane (surface No 1) at the object side of the first lens group L1) can be lower than 1.2, and the miniaturization can be accomplished as compared to the existing technology. Moreover, as for the characteristic of the incident angle, it can be ensured that the maximum incident angle a of the image lens assembly is smaller than 25°. And it is necessary to ensure that the inclination of the primary ray emitted from the optical system into the image taking device is within 15°. Currently, along with the development of the technology of the image taking device (the changes in the shape of the mini Lens), the incident angle can be lower than 25°.

The three-piece lens assembly in accordance with the present invention is capable of reducing the magnification while increasing the angel of view, so it is very suitable for being used in digital camera and mobile phone.

While we have shown and described various embodiments in accordance with the present invention, it is clear to those skilled in the art that further embodiments may be made without departing from the scope of the present invention.

What is claimed is:

1. A three-piece lens assembly comprising:
   a first lens group being a positive meniscus lens with a convex surface facing the object side and with another surface facing an aperture;
   a second lens group being a positive meniscus lens with a concave surface facing the aperture and the object side;
   a third lens group being a biconcave lens with a concave surface facing the second lens and the object side and with another surface facing the image side, the concave surface of the third lens facing the object side being greater than the another surface of the third lens facing the image side in radius of curvature;
   wherein both sides of the first, second and third lens groups are aspheric and are all made of plastic material;
   a focal length of the first lens group is $f_1$, and a focal length of the second lens group is $f_2$, they satisfy the relation: $5.0<f_2/f_1<18.0$.

2. The three-piece lens assembly as claimed in claim 1, wherein a focal length of an optical system consisted of the first, second and third lens groups is f, and a thickness of the first lens group is d1, they satisfy the relation: $5.0<f/d1<6.0$.

3. The three-piece lens assembly as claimed in claim 1, wherein the focal length of an optical system consisted of the first, second and third lens groups is f, and a thickness of the second lens groups is d2, and they satisfy the relation: $7.0<f/d_2<6.0$.

|  | $f_2/f_1$ | (R31 − R32)/(R31 + R32) | f/d1 | f/d2 | T/f | a (°) | v d1 | v d2 | v d3 |
|---|---|---|---|---|---|---|---|---|---|
| Embodiment 1 | 7.55 | −2.55 | 5.72 | 7.54 | 1.19 | 24.3 | 56.5 | 30.2 | 56.5 |
| Embodiment 2 | 9.39 | −1.53 | 5.81 | 9.08 | 1.19 | 25.0 | 56.5 | 30.2 | 56.5 |
| Embodiment 3 | 5.81 | −1.27 | 5.65 | 8.67 | 1.19 | 25.0 | 56.5 | 30.2 | 56.5 |
| Embodiment 4 | 17.22 | −1.08 | 5.48 | 8.53 | 1.19 | 25.0 | 55.8 | 30.2 | 55.8 |
| Embodiment 5 | 14.29 | −1.09 | 5.39 | 8.33 | 1.19 | 25.0 | 56.8 | 30.2 | 56.8 |
| Embodiment 6 | 6.81 | −3.74 | 5.63 | 7.36 | 1.19 | 24.1 | 56.5 | 30.2 | 56.5 |
| Embodiment 7 | 5.40 | −3.18 | 5.82 | 7.51 | 1.19 | 24.1 | 56.5 | 30.2 | 56.5 |

4. The three-piece lens assembly as claimed in claim 1, wherein a reciprocal dispersion of the first lens assembly is vd1, a reciprocal dispersion of the second lens assembly is vd2, and a reciprocal dispersion of the third lens assembly is vd3, they satisfy the following relations:

$$50 \leq vd_1 \leq 60$$

$$25 \leq vd_2 \leq 35$$

$$50 \leq vd_3 \leq 60.$$

* * * * *